Nov. 2, 1965        W. H. BRAUN        3,215,047
METHOD OF MAKING BRANCHES FOR ARTIFICIAL TREES
Filed June 28, 1963        2 Sheets-Sheet 1
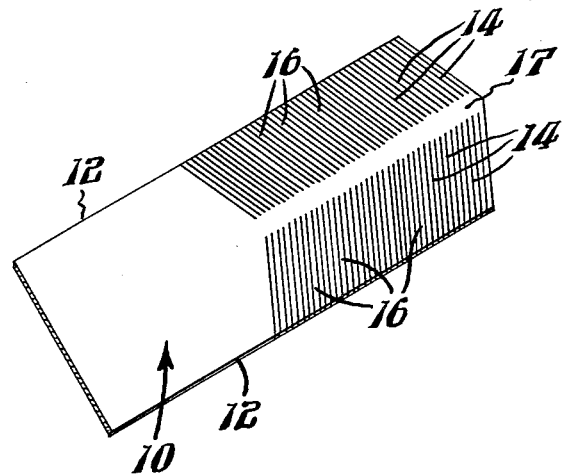
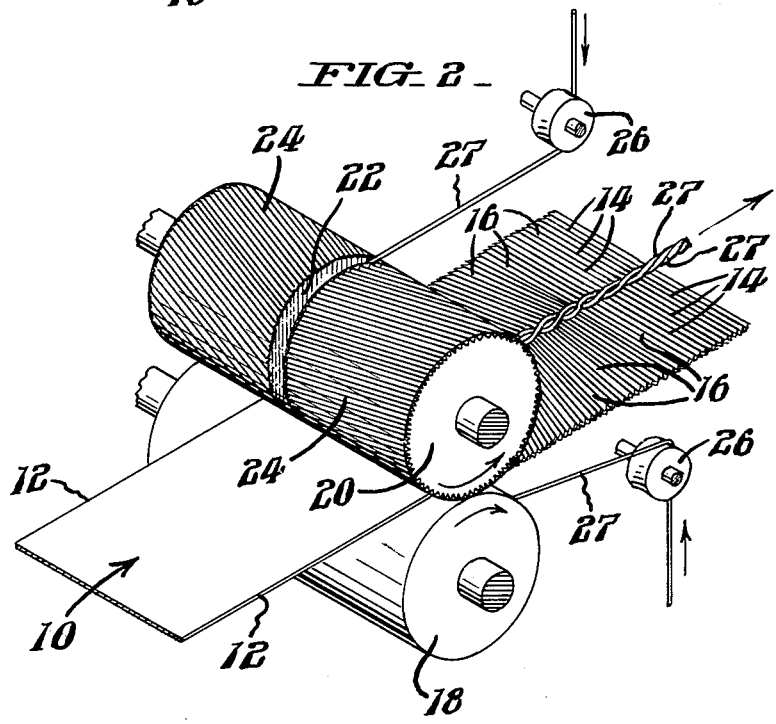
INVENTOR.
William H. Braun,
BY
Paul & Paul
ATTORNEYS.

Nov. 2, 1965    W. H. BRAUN    3,215,047
METHOD OF MAKING BRANCHES FOR ARTIFICIAL TREES
Filed June 28, 1963    2 Sheets-Sheet 2

INVENTOR.
William H. Braun,
BY
Paul & Paul
ATTORNEYS.

United States Patent Office 3,215,047
Patented Nov. 2, 1965

3,215,047
METHOD OF MAKING BRANCHES FOR ARTIFICIAL TREES
William H. Braun, Elkins Park, Pa., assignor to Carey-McFall Co., Philadelphia, Pa., a corporation of Pennsylvania
Filed June 28, 1963, Ser. No. 291,496
2 Claims. (Cl. 93—1.5)

This invention relates to branched articles such as artificial trees and to decorative material for garlands, wreaths, sprigs and the like and to the method of making the same.

Branches for artificial trees for example, are commonly made by cutting an initially flat strip of vinyl material to form two series of fingers extending outwardly respectively in opposite directions from an uncut longitudinally extending medial area, at right angles thereto, placing said strip between a pair of wires and twisting together the strip and wires to bend the wires to helical form with said medial area therebetween, the twisted wires forming the spine of the branch. This common practice has not proved to be entirely satisfactory because in the assembled branch stock material the fingers radiate outwardly in all directions from the spine of the stock material and all slant in the same direction longitudinally of the spine so that when one continuous length of the assembled branch stock material is used to form two branches of a tree, the fingers of one branch slant in the wrong direction. If, in an effort to avoid this disadvantage, separate lengths are used for the two branches, the ends of the spines connected to the tree trunk extend through and beyond the tree trunk to form unsightly sharp projections upon which the operator may cut her hands when folding the branches against the tree trunk while placing the tree in a carton for shipment. In addition to the foregoing considerations, the fingers are unduly short, in consequence of which the branch is not as full in appearance as it might be. Furthermore, to achieve a given fullness in appearance, an unduly great amount of material is required. Accordingly, a principal object of the invention is to provide a branch for an artificial tree, which branch is made from a flat sheet material strip having chevron type cuts providing two sets of fingers disposed respectively on opposite sides of the strip and at such acute angles to a longitudinally extending medial uncut area that when the wires are twisted together, to a pitch depending upon the magnitude of said angles, to form the spine of the branch, said fingers extend radially outwardly in all directions substantially at right angles to said spine.

Another object is to provide such a branch wherein for a given width of strip material, the fingers are longer and the branch fuller in appearance.

Another object is to provide such a branch affording a fuller appearance with a given amount of material or affording a given appearance with less material.

Another object is to provide assembled branch stock material a single length of which may be used to form two branches with the needles of both branches pointing in the desired direction.

Other objects of the invention will become apparent when the following description is read with reference to the accompanying drawings, in which:

FIGURE 1 is a plan view of strip material having chevron type cuts which form fingers in accordance with the invention;

FIGURE 2 is a diagrammatic perspective view illustrating how the strip material is made;

Figure 3:
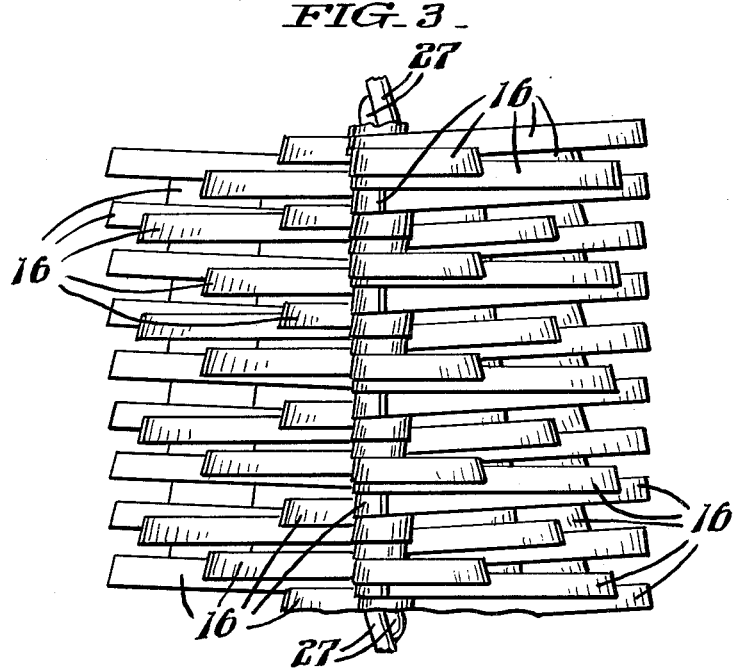
FIGURE 3 is a fragmentary elevation showing the assembled branch components as they come off the apparatus shown in FIGURE 2.

The following description is directed to the specific form of the invention illustrated in the drawings and is not intended to be addressed to the scope of the invention itself, which may be practiced in a variety of forms and arrangements.

Referring particularly to FIGURE 1, a strip of sheet material, such as vinyl, metal foil, paper or the like, generally designated 10, having opposite side edges 12, is cut inwardly from said edges, as at 14, to form two series of straight parallel fingers 16 of the same width. The fingers 16 extend outwardly in opposite directions from an uncut longitudinally extending medial area 17 and toward the same end of the strip 10.

Referring particularly to FIGURE 2, apparatus for making the chevron type cuts 14 in the strip material 10 to form the fingers 16 comprises a roll 18 and a coacting cutter roll 20 overlying the roll 18. Each roll is provided with a circumferentially extending groove 22 intermediate the ends thereof, and the roll 20 is provided with a series of cutting edges 24, which coact with the plain surface of the roll 18 for cutting the strip material 10. Guides 26 are provided for a pair of wires 27.

The strip 10 is fed in a flat state through and between the coacting rolls 18 and 20. As the strip passes through the rolls, the cutting edges 24, coacting with the surface of the roll 18, cut opposite side marginal areas of the strip 10, as at 14, to form the fingers 16. The wires 27, initially straight, are fed respectively under and over the rolls 18 and 20 and around and through the same in the grooves 22, being disposed thereby on opposite faces of the medial area 17 of the strip 10 as it passes through the rolls. The wires may be cord, plastic, twisted paper or the like, metal being preferred, and they may be either square or rectangular in transverse section. As the strip 10 and the pair of wires 27 advance together after passing through the rolls 18 and 20 they are simultaneously twisted together to a predetermined pitch, depending upon the magnitude of the angle of the chevron cuts 14 relative to the medial area 17 of the strip 10. Twisting mechanism suitable for this purpose is well-known in the art. Wires 27 are twisted to a pitch such as to cause the fingers 16 to radiate from the twisted wires 27 in all directions and to position each finger at substantially right angles to the spine formed by the twisted wires 27, as shown in FIGURE 3. This is the desideratum.

Figure 4:
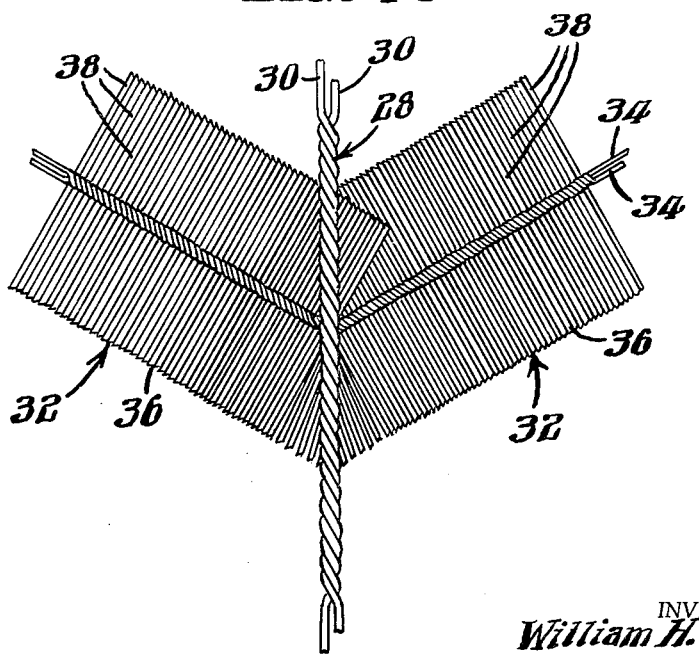
FIGURE 4 is a diagrammatic elevation showing a pair of branches made from a single length of the assembled branch stock material and extending respectively from diametrically opposite sides of the tree trunk.

Referring particularly to FIGURE 4, the trunk of an artificial tree, generally designated 28, comprises a pair of wires 30 twisted together. Extending from diametrically opposite sides of the trunk 28 and upwardly are a pair of branches 32, both of which are formed from a single length of the assembled branch stocking material, the twisted wires forming the spines of the branches being designated 34 and the strip material being designated 36. It will be noted that in spite of the fact that a single length of the assembled branch stock material is used to fashion two branches of the tree, all of the fingers, designated 38, point in the desired direction, giving the tree the best appearance possible. In addition, since the fingers 38 are longer than they would be if the cuts 14 were made normal to the medial area 17 and opposite side edges 12, the diameter of the branches is greater and the branches are full in appearance. Thus a given fullness in appearance may be achieved with less material. In fact, a saving of material ranging up to one-third may be realized.

Although sheet material 10 has been described and shown as single ply, in practice two- or more ply sheet material may be used, it being desirable to use plies of the same color but of different shades. In addition, referring to FIGURE 2, when the wires 27—27 are twisted together to form the spine, the pitch to which they are twisted varies somewhat, being greatest at the rolls 18 and 20, in consequence of which the angle between the fingers and the spine varies somewhat, as indicated. To cancel this variation, the fingers on one side of the sheet material may be disposed at a slightly different angle (different by, say, approximately five degrees) than fingers on the other side so that in each portion along the length of the finished branch, some fingers will slant a little toward one end of the branch and others will slant a little toward the opposite end of the branch. Furthermore, referring particularly to FIGURES 2 and 4, although the twisted wires 27—27 and 34—34 are shown bared, actually they are covered by the strip material 10 and 36. Moreover, referring particularly to FIGURE 4, preferably, the wires 30—30 are twisted with and covered by strip material similar to strip material 36.

The parallel relation of the cuts 14 and the equal spacing thereof are shown only for illustrative purposes, as for the purpose of making a product which presents a uniform appearance.

It will be understood, of course, that the present invention, as described and shown, is susceptible to various changes and modifications which may be made without any departure from the general principles or real spirit of the invention. Accordingly, it is intended to claim the present invention broadly, as well as specifically, as indicated in the appended claims.

What is claimed is:

1. In a method of making branch material for artificial trees, the steps including feeding a flexible strip of sheet material through the nip of a pair of rollers, simultaneously cutting said strip of sheet material to form a series of fingers disposed at an acute angle relative to a longitudinally extending uncut area of said strip of sheet material connecting all of said fingers together, feeding a pair of wire members through said rollers and advancing the same with said strip of sheet material with one of said wire members overlying and the other underlying said uncut finger connecting area, and twisting said wire members together in helical form to a pitch effective to displace said fingers angularly and position them substantially at right angles to said twisted wire members.

2. The method of making branch material for artificial trees according to claim 1 wherein the wire members are twisted to a pitch which becomes smaller in proportion to the distance from the rollers so that displacement of the fingers angularly as they move away from said rollers is progressive.

References Cited by the Examiner
UNITED STATES PATENTS

| | | | |
|---|---|---|---|
| 1,609,056 | 11/26 | Bouchard | 161—15 |
| 2,639,532 | 5/53 | Seewald. | |
| 3,084,456 | 4/63 | Hellrich | 161—22 |

JACOB H. STEINBERG, *Primary Examiner.*

ALEXANDER WYMAN, *Examiner.*